United States Patent
Braun

[19]

[11] Patent Number: 5,996,891
[45] Date of Patent: Dec. 7, 1999

[54] SIM CARD CONTACTING DEVICE

[75] Inventor: Gerhard Braun, Bitzfeld, Germany

[73] Assignee: Amphenol-Tuchel Electronics GmbH, Heilbronn, Germany

[21] Appl. No.: 08/964,986

[22] Filed: Nov. 5, 1997

[30] Foreign Application Priority Data

Nov. 5, 1996 [DE] Germany ............................ 196 45 584
Aug. 8, 1997 [DE] Germany ............................ 197 34 424

[51] Int. Cl.[6] .................................................. G06K 7/06
[52] U.S. Cl. ...................... 235/441; 235/482; 235/486; 235/492; 439/326
[58] Field of Search .................................. 235/441, 475, 235/486, 492, 482; 439/326

[56] References Cited

U.S. PATENT DOCUMENTS

| | | | |
|---|---|---|---|
| 4,735,578 | 4/1988 | Reichardt et al. | 439/152 |
| 4,752,234 | 6/1988 | Reichardt et al. | 439/260 |
| 4,799,891 | 1/1989 | Reichardt et al. | 439/43 |
| 4,814,593 | 3/1989 | Reichardt et al. | 235/482 |
| 4,932,889 | 6/1990 | Bleier et al. | 439/260 |
| 4,975,086 | 12/1990 | Reichardt et al. | 439/629 |
| 4,976,630 | 12/1990 | Schuder et al. | 439/260 |
| 5,259,777 | 11/1993 | Schuder et al. | 439/188 |
| 5,269,707 | 12/1993 | Reichardt et al. | 439/630 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,369,259 | 11/1994 | Bleier et al. | 235/441 |
| 5,370,544 | 12/1994 | Reichardt et al. | 439/188 |
| 5,550,361 | 8/1996 | Huis et al. | 235/440 |
| 5,586,890 | 12/1996 | Braun | 439/66 |
| 5,640,307 | 6/1997 | Bleier et al. | 361/740 |
| 5,718,604 | 2/1998 | Braun et al. | 439/630 |
| 5,726,432 | 3/1998 | Reichardt et al. | 235/441 |
| 5,796,085 | 8/1998 | Bleier | 235/441 |
| 5,796,093 | 8/1998 | Reichardt et al. | 235/492 |
| 5,814,805 | 9/1998 | Dullin | 235/479 |
| 5,837,984 | 11/1998 | Bleier et al. | 235/441 |
| 5,872,353 | 2/1999 | Reichardt et al. | 235/441 |

FOREIGN PATENT DOCUMENTS 0 472 692   10/1991   European Pat. Off. ......... H05K 7/02

*Primary Examiner*—F. L. Evans
*Attorney, Agent, or Firm*—Bacon & Thomas

[57] ABSTRACT

The present invention provides for a SIM card reader with a contact support comprising contact elements with a cove for receiving a SIM card comprising two spaced longitudinal side edges and two spaced front and rear edges, with preferably two bearing apparatusses on the contact support and cover for enabling a pivoting motion between the cover and the contact support.

16 Claims, 3 Drawing Sheets

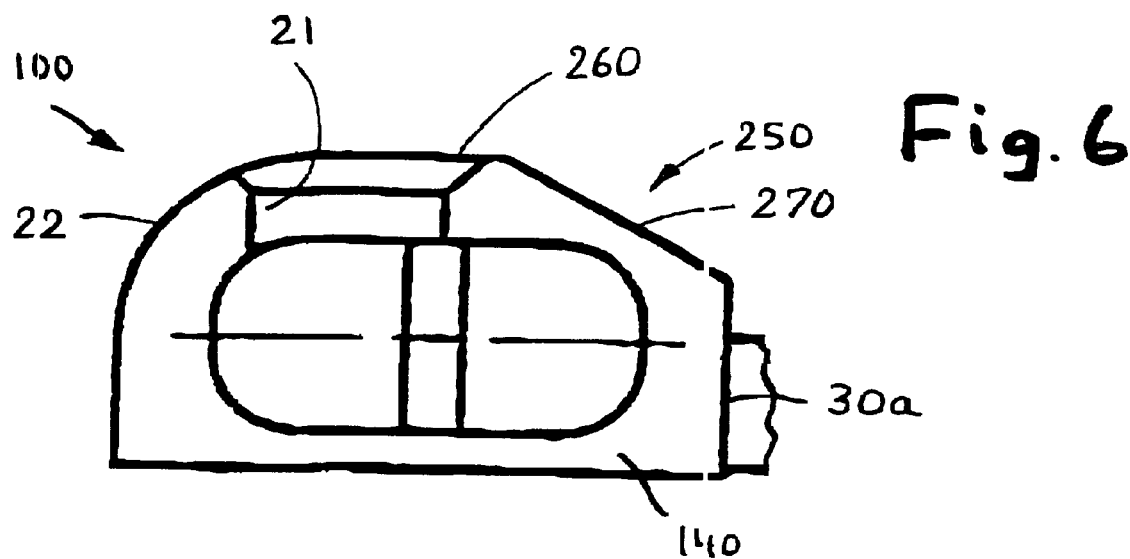

SIM CARD CONTACTING DEVICE

FIELD OF THE INVENTION

The invention relates to a contacting device in general for chip cards and, in particular, for SIM cards. Such a contacting apparatus can be called, for short, a card reader or, in particular, a SIM card reader.

BACKGROUND OF THE INVENTION

A contacting device, in particular for a SIM (Subscriber Identity Module) is known, for example, from WO 91/15101. In this contacting device, a housing is provided that is formed as a contact support, and the SIM is pressed by a cover or a portion of the housing against contact elements located in the contact support when the SIM is in place. Bearing and linking means serve for mounting the cover to the contact support.

SUMMARY OF THE INVENTION

SIM card readers are frequently used in telephone devices, in particular in so called cellular phones that are to be built as small as possible.

In accordance with the invention, in particular a SIM card reader possessing a small width and structural height is to be provided.

In accordance with the invention, this is achieved in that one provides the bearing means comprising bearing apparatusses or bearing locations within the width of the card for the cover preferably formed as a pivot and slide cover.

In accordance with the invention, the structural height of the SIM card reader is reduced in particular in that one limits the height of the bearing apparatusses providing the bearing locations, in particular through the use of one or more cam surfaces for the guiding of the SIM card.

Whereas, in the aforementioned prior art the pivot and slide cover can be shut such that the card carries out a purely rotational or pivoting motion (practically without a sliding of the SIM card within the cover) when being locked due to the bearing locations positioned to the side along the longitudinal side of the card, the cam surfaces formed preferably on the bearing apparatusses provided in accordance with the invention allow the card to move during the pivoting of the cover to its contacting position along this partially relatively flat cam surface to a contact receiving means formed in the contact support, namely via a sliding of the SIM card relative to the cover.

Through the measures in accordance with the invention, favorable outer dimensions (in mm) of, for example, 30×17.2×2.5 are implemented, whereby, when the cover is pivoted closed, the card contacts of the SIM card land in the middle of the contact field of the contact elements, which is ensured by the aforementioned cam surface. This means that the SIM card is forceably guided by the cam surface when the cover is pivoted closed such that the card contacts land in the middle of the contact field of the contact elements. Thus, the SIM card carries out a motion relative to the cover that is dictated by the cam surface when the cover is closed.

In accordance with the invention, a SIM card reader is provided that comprises a flat contact support forming a card receiving means, on which contact support a cover is pivotably mounted by means of two bearing apparatusses. The two bearing apparatusses are located essentially within the width of the card. Preferably, the bearing apparatusses lying within the width of the card are displaced towards the rear in the longitudinal direction of the SIM card reader. The term "towards the rear" is used to express that the bearing apparatusses are displaced relative to an abutment surface for the rear card edge, said abutment surface formed by the card receiving means. It should be noted in this context that the SIM card, in addition to two spaced longitudinal side edges, comprises two shorter, also spaced card edges, namely a front edge and a rear edge, whereby the front edge comprises a bevelling.

The novel features which are considered as characteristic of the invention are set forth in particular in the appended claims. The invention itself, however, both as to its construction and its method of operation, together with additional objects and advantages thereof will be best understood from following description of specific embodiments when read in connection with the accompanying drawings.

BRIEF DESCRIPTION OF THE DRAWINGS

FIG. 6 is a detailed view illustrating the bearing block of a further embodiment.

DETAILED DESCRIPTION OF THE PREFERRED EMBODIMENTS

Figure 1:
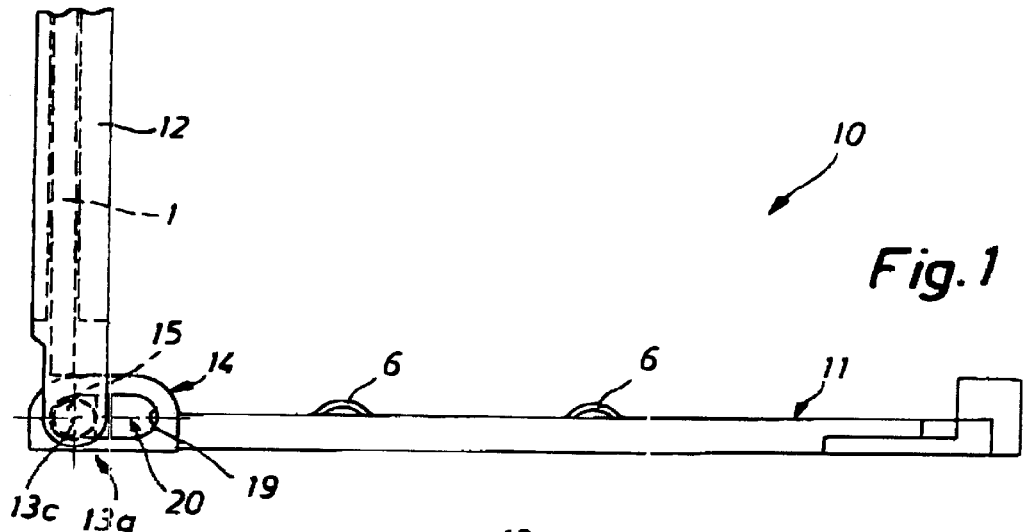
FIG. 1 is a side view of a SIM card reader in accordance with the invention consisting of a contact support and a cover, wherein the cover is located in a card insertion position.

A first embodiment of the invention will now be described based on FIGS. 1–5.

The invention will be described based on a SIM card reader 10, but is also applicable to a regular chip card reader.

The SIM card reader 10 in accordance with the invention comprises a frame or contact support 11 in which several contact elements 6 are mounted, e.g. via injection molding. A cover 12 is rotatably mounted via bearing means onto the contact support 11. The cover 12 serves for receiving a SIM card 1.

Card receiving means are provided for this purpose along the length of the side edges of the cover 12 and comprise wings 74. The cover 12 and the contact support 11 are preferably each manufactured as a single piece of plastic. It is also possible to form the cover from metal.

The SIM card.

The SIM card 1 is illustrated in the drawings by dashed lines. The SIM card 1, cf. FIG. 3, comprises a front edge 2 with a bevelling 3 and a rear edge 4. Furthermore, side edges 5a and 5b are provided. The SIM card possesses card contacts (not shown) located in the contact field for contacting the contact elements 6 also located in a contact field.

The bearing means.

Figure 2:
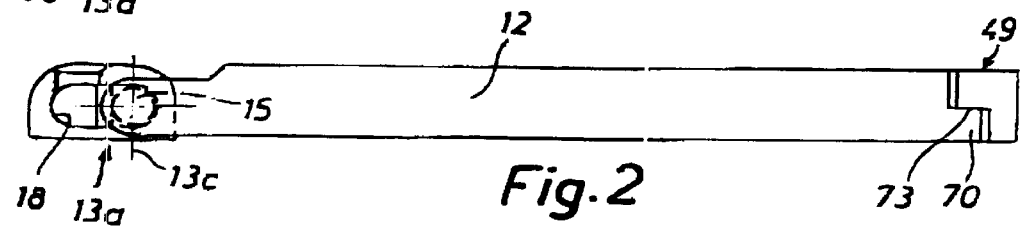
FIG. 2 is a side view of the SIM card reader of FIG. 1, wherein the cover is located in its locked position.

In the illustrated first embodiment, the bearing means are formed by two spaced bearing apparatusses (or bearing positions) 13a and 13b (cf. FIG. 2). The two bearing apparatusses 13a and 13b are formed as mirror images such that solely the bearing apparatus 13a will be described in the following. The bearing apparatusses 13a, 13b allow, on the one hand, a pivoting of the cover 12 relative to the contact support 11 around an axis of rotation 13c. After the cover 12 is pivoted by 90° into its closed or contact position from the card insertion position shown in FIG. 1, the bearing apparatusses 13a, 13b further preferably allow a displacement of the cover 12 in FIG. 1 to the right into a locking position for the cover 12, which is illustrated in FIG. 2. During the displacement of the cover 12 from the contact position of the cover 12 into the locking position of the cover 12, the SIM card 1 remains in its contact position with the contact elements 6 that was already reached at the end of the pivoting movement of the cover by 90°.

Figure 3:
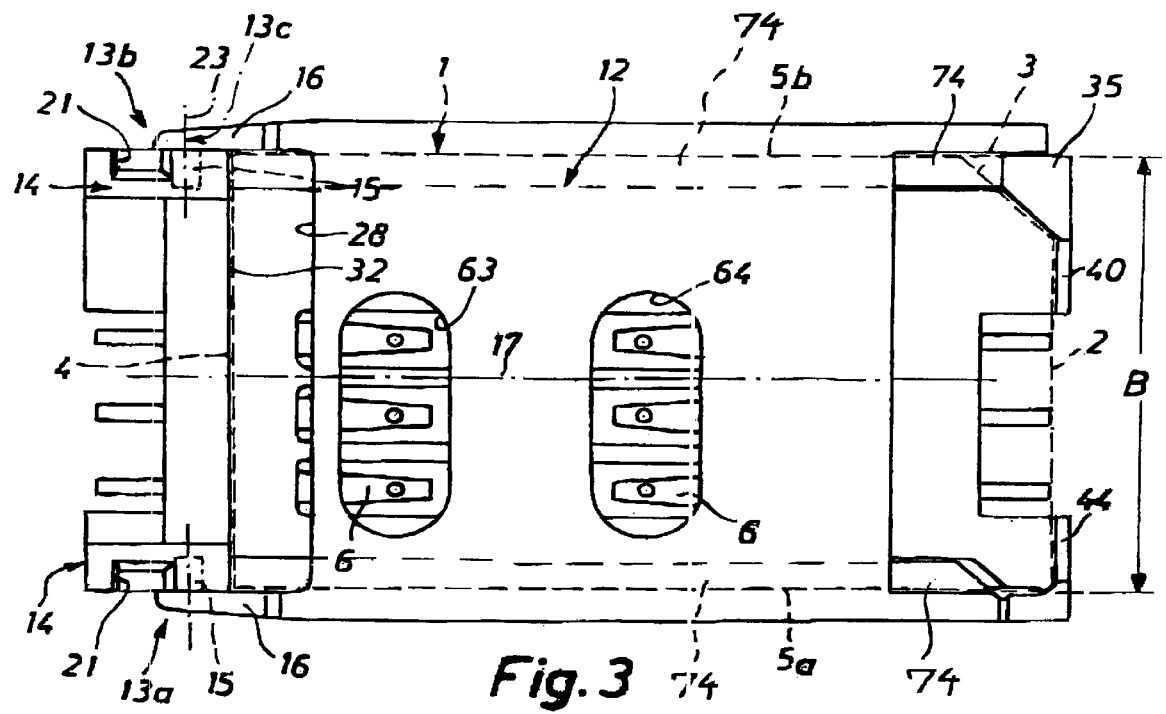
FIG. 3 is a plan view of the SIM card reader in accordance with FIG. 2.
Figure 4:
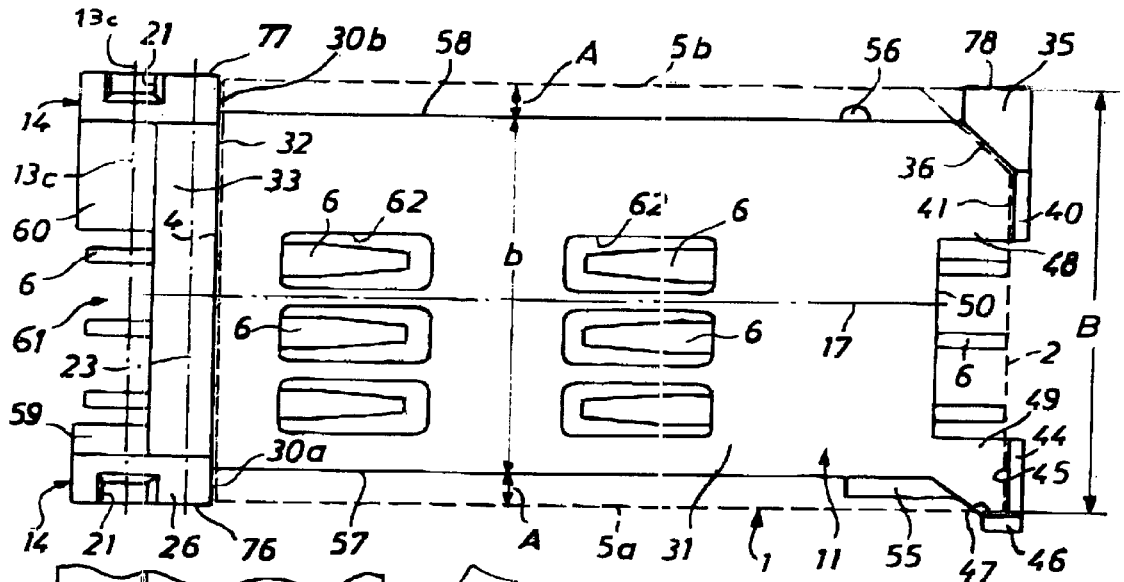
FIG. 4 is a plan view of the contact support of the SIM card reader of FIGS. 1 to 3.

The bearing apparatusses 13a, 13b are located within the width B of the SIM card 1, as one can easily recognize in FIGS. 3 and 4. The bearing apparatus 13a comprises a (stationary) bearing portion (bearing block) 14 formed, in particular, on the contact support 11 preferably as a single piece together with same. The bearing apparatus 13a further comprises a (rotatable) bearing portion. This preferably has the form of a peg (tab) 15 on the cover 12 and is preferably formed as a single piece with same. The pegs 15 protrude from arms 16 formed on the cover 12 perpendicularly to the card reader longitudinal axis 17 towards the inside, in particular (in the inserted condition) into a recess 20 formed in the bearing block 14. The recess 20 (cf. FIGS. 1 and 2) comprises two sections, in particular a rotation recess 18 (FIG. 2) and a locking recess 19 (FIG. 1). Between these two recesses 18, 19, a small crossbar is located so that a slight resistance must be overcome during the transition of the pegs 15 of the cover 12 from the rotation recess 18 to the locking recess 19 and vice-versa. For inserting the pegs 15 into the corresponding recess 19 in the bearing blocks 14, pass openings 21 that allow the insertion of the pegs 15 from the top are preferably formed in the bearing blocks 14. Naturally, instead of mounting the entire cover 12 displaceably, only a portion of the cover 12 could also be formed displaceably in order to allow the locking of the cover 12 in the contact position of the SIM card.

The cam surface 25.

Figure 5:
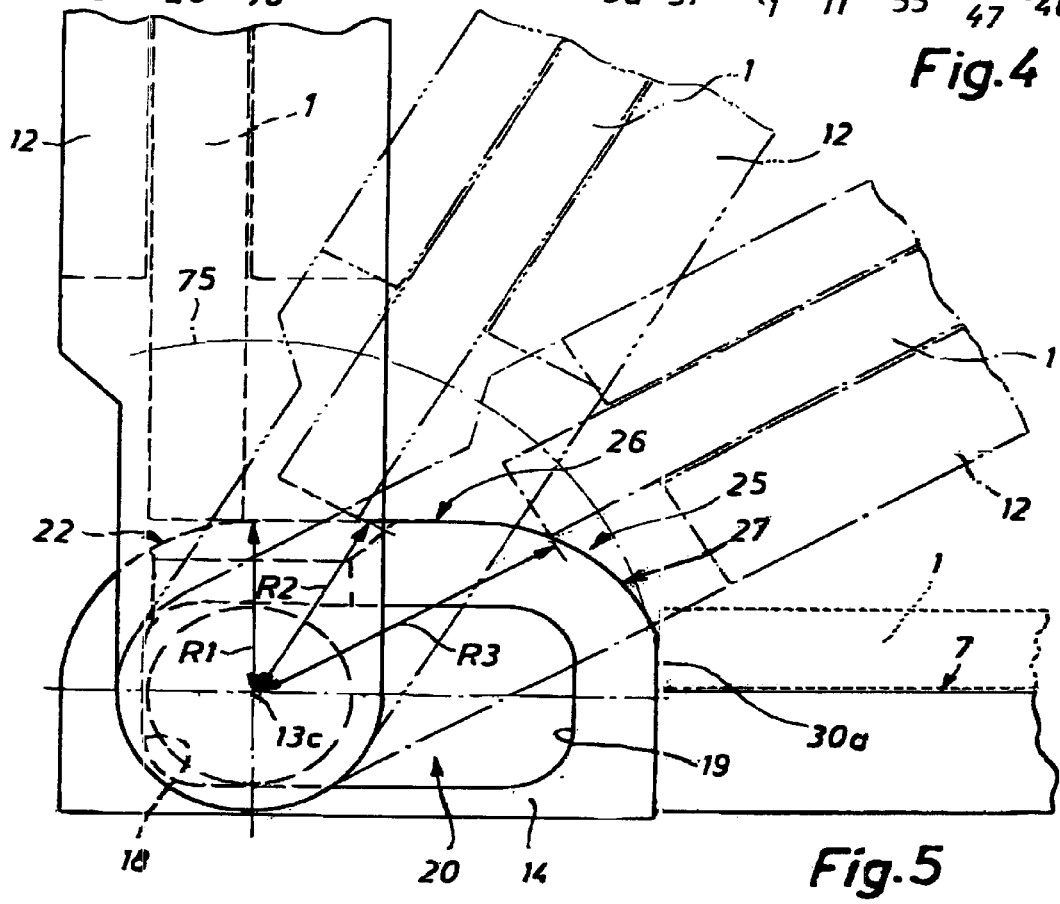
FIG. 5 is a schematic view of a detail of the SIM card reader of FIG. 1 illustrating that the SIM card carries out a relative motion relative to the cover during the pivoting motion of a cover from its card insertion position to its contact position, said motion being effected by a cam surface.

Each of the bearing blocks 14 comprises a cam surface 25 on its upper side that comprises, in particular, a planar surface 26 and, adjacent thereto, a pivoting radius surface 22 to the left in FIG. 5 and a pivoting radius surface 27 to the right. The pivoting radius surface 27 ends just above the abutment surfaces 30a and 30b that are formed by the bearing blocks 14. These abutment surfaces 30a, 30b for the rear edge 4 form a card receiving means 7 together with still to be described abutment surfaces for the front edge 2 of the card 1 and its bevelling 3. The card receiving means 7 defines the contact position for the SIM card.

The contact support 11.

The contact support 11 comprises a planar platen portion 31 on whose narrow side (to the left in FIG. 4) the spaced bearing blocks 14 are provided. In alignment with the abutment surfaces 30a, 30b, an abutment surface 32 is preferably also provided that is formed by a crossbar 33 formed as a single piece with the platen portion 31. The crossbar 33 protrudes somewhat upwardly relative to the upper side of the platen portion 31 and preferably has a height in approximately the same range as the thickness of the SIM card 1. The height of the crossbar 33 is, however, preferably not as high as the height of the planar surface 26.

Opposite the abutment surface 32, further abutment surfaces already mentioned above for the SIM card 1 are provided for forming the card receiving means 7. On the one hand, a shoulder 35 protruding upwardly from the platen portion 31 forms a diagonal abutment surface 36 for the bevelling provided on the SIM card 1. Futhermore, a flange 40 that runs perpendicular to the longitudinal axis 17 of the SIM card reader 10 forms an abutment surface 41. A further flange 44 is provided in alignment with the flange 40 but spaced therefrom and also running perpendicular to the longitudinal axis 17 of the SIM card reader, said flange 44 forming an abutment surface 45 for the front edge 1 of the SIM card 1. A further flange 46 stretches preferably starting from flange 44 parallel to the longitudinal axis of the SIM card reader in the direction of the abutment surface 32, preferably only over a short distance and forms a side abutment surface 47 for a small portion of the side edge 5a, in particular a part that lies adjacent to the front edge 2. An abutment surface 47 completes the card receiving means 7.

A shoulder 35, flanges 40, 44 and 46 are, so to say, formed on tongues 48, 49 of the planar platen portion 31 and form a recess 50 therebetween into which ends of the contact element 6 protrude. The tongues 48, 49 form an extension with their upper sides of the plane or surface formed by the upper side of the planar platen portion 31.

Longitudinal side edges 57, 58 of the planar platen portion 31 are displaced relative to the side surfaces 76 and 77 (FIG. 4) of the bearing portions 14 and relative to the side surface 78 of the shoulder 35 as well as the abutment surface 47 preferably by the same distance A to the reader longitudinal axis 17. The width b of the platen portion 31 is thus smaller than the width B of the card 1. This creates space for the housing of the arms 16 as well as the side card guiding portions of the cover 12.

A guide surface 55 protruding out from the longitudinal side edge 57 and a guide tongue 56 protruding out from the longitudinal side edge 58 lie preferably at a vertically somewhat lower level relative to the level of the surface of the planar platen portion 31. Guide surface 55 and guide tongue 56 work together with complementary formed surfaces on the cover 12 in order to achieve a good guidance during the translational motion of the cover 12 from the contact position of the over 12 into the locking position of the cover 12.

Surface elements 59 and 60 adjacent to the bearing blocks 14 increase the stability and form a cutaway 61 into which the connections, preferably SMD connections of the contact elements 6 protrude. In the illustrated embodiment, three contact elements are thus led out to the cutaway 61 in the preferred manner and three contacts elements are led out to the recess 50. Finally, windows 62 are also provided in the planar platen 31 that allow a passing through of the contact elements 6.

Oval openings 63, 64 are provided in the upper side of the cover 12 in the area of the contact ends of the contact elements 6, in particular, when the cover 12 is located in the locked position.

The functionality of the chip card reader 1 in accordance with the invention.

Assuming that the cover 12 with its pegs 15 is already in inserted (in place) through the passage openings 21 in the rotational recesses 18 and assumes roughly the card insertion position shown in FIG. 1, the SIM card 1 is inserted into receiving means formed in the cover 12. Naturally, the cover 12 must not necessarily assume the vertical position shown in FIG. 1 but can already possess a somewhat tilted position, eg. the middle position shown in FIG. 5. After the insertion of the card 1 into the cover 12, the card 1 sits with its rear edge on the cam surface 25 of the two bearing blocks 14. The cover 12 is thus not closed to the rear (or below in FIG. 1) but rather forms a type of cutout in the cover 12 due to the arms 16.

After the SIM card 1 is inserted into the cover 12, same is pivoted, as shown in FIG. 5, whereby the card 1 runs along the cam surface 25 with its rear edge 4 (bottom edge in FIG. 5) in order to arrive at the pivoting radius surface 27 via the planar surface 26 in order to then be located in the card receiving means 7 from the pivoting radius surface 27 with the rear edge 4 adjacent to the abutment surface 30a. This position then achieved can be designated as the contact position since the SIM card contacts are aligned in this contact position with the contact field of the contact elements in the contact support 11. The SIM card 1 is held in this contact position via the card receiving means 7, i.e. the aforementioned abutment surfaces 30a, 30b, 32, 36, 41, 45 and 47. As a next step, the cover 12 is then displaced from the contact position into the cover locked position shown in FIG. 2. Naturally, the card 1 is in the same position, namely the contact position of the SIM card 1 with the contact elements 6, in both the contact position of the cover as well as in the locked position of the cover.

In the locked position of the cover 12, a tongue portion 70 of the cover 12 lies under an abutment surface 73 formed by the flange. In the locked position, the front end (cannot be seen anymore in FIG. 3) of a wing portion 74 of the cover 12 further runs under an abutment surface formed by the shoulder 35 diametrical to the longitudinal axis of the SIM card reader 17.

One can see, in accordance with the invention, that the bearing apparatusses 13a, 13b, in particular the stationary bearing blocks or bearing portions 14 are located within the width B of the inserted SIM card 1. The bearing blocks 14 are displaced to the left in FIG. 3 relative to the abutment surface 32. The locked position of the cover 12 is characterized in FIGS. 3 and 4 by the dashed-dotted line 23 and lies directly adjacent to the abutment surface 32 (but displaced to the left in FIGS. 3 and 4), whereas the dashed-dotted line illustrating the rotational axis 13 is provided again displaced farther to the left relative to the locked position 23 of the bearing pegs 15. The cam surface 25 ensures that a certain transition of the card 1 executing a relative motion relative to the cover 12 is achieved in spite of this configuration during the transition from the insertion position to the contact position. This is illustrated in detail in FIG. 5. During insertion, the card 1 can touch down on the cam surface 25 at the position where the arrow R1 ends. During movement into the middle position, the card runs along the planar surface 26, for example to the position designated by R2. Since R2>R1, a relative motion of the card 1 results. The arrow R3 indicates that a further relative displacement of the card 1 results when the cover 12 is further pivoted until, finally, the card arrives at the card receiving means 7. Without the cam surface in accordance with the invention, a cam surface of a form as indicated by the circular arc 75 in FIG. 5 would have to be provided that would, however, result in a large structural height.

FIG. 6 shows a further preferred embodiment of a SIM card reader 100 in a view similar to the illustration of FIG. 5 relating to the SIM card reader 100. In FIG. 6, only the bearing block 140 corresponding to the bearing block 14 of FIG. 5 is illustrated. The bearing block 140 differs from bearing block 14 in that the cam surface 250 of bearing block 140 is modified Generally speaking, the pivoting radius 27 of bearing block 14 is replaced by a slanted surface 270. In detail, with regard to the cam surface 250 in accordance with the embodiment of FIG. 6, surface 260 corresponding to the planar surface 26 of FIG. 5 is shortened and ends roughly (to the right in FIG. 6) adjacent to the pass opening 21 in order to then essentially directly change over to the slanted surface 270. The slanted surface 270 thus runs, starting from the planar surface 260, slantedly downwardly towards the upper end of the abutment surface 30a. The slanted surface 270 has a preferably planar form and is naturally provided on the two bearing blocks 140. The pivoting radius surface 22 in FIG. 6 is provided as in FIG. 5.

I claim:

1. A SIM card reader with a contact support comprising a contact element with a cover for receiving a SIM card comprising two spaced longitudinal side edges and two spaced front and rear edges, with bearing means on the contact support and cover for enabling a pivoting motion between the cover and the contact support, wherein the bearing means comprises a stationary bearing portion on the contact support and a rotatable bearing portion on the cover wherein the bearing portion on the contact support lies within the circumference of the SIM card inserted in the SIM card reader.

2. A SIM card reader in accordance with claim 1, wherein the bearing portion on the contact support is provided with a cam surface such that the card is pivoted into a card receiving means when the cover is closed.

3. A SIM card reader in accordance with claim 1, wherein the bearing portions are formed flattened out for limiting the structural height of the SIM card reader and comprise, on their upper side, an essentially planar surface that goes over from a card receiving means to a pivoting radius surface.

4. A SIM card reader in accordance with claim 3, wherein the card receiving means is formed on the contact support via abutment surfaces.

5. A SIM card reader in accordance with claim 1, wherein the bearing portions comprise openings accessible from above in order to allow the insertion of the bearing portions of the cover formed as pegs.

6. A SIM card reader in accordance with claim 1, wherein the width of the SIM card reader in the area of the bearing portions on the contact support and in the area of the front edge of an inserted SIM card approximately corresponds to the width of the SIM card, the contact support possesses a lesser width at least in such a way that the side portions of the cover present for receiving the card come to rest in recesses of said side portions such that the cover does not effect a significant-widening of the SIM card reader beyond the width of the SIM itself.

7. A SIM card reader in accordance with claim 2, wherein the cam surface is provided on the upper side of the bearing portion on the contact support and comprises an essentially planar surface as well as a pivoting radius surface adjacent to the planar surface on both sides and wherein a card receiving means is formed on the contact support.

8. A SIM card reader in accordance with claim 1, wherein a side abutment surface is provided adjacent to the front edge.

9. A SIM card reader in accordance with claim 1, wherein guide surfaces or guide tongues are provided in the vicinity of the front edge protruding to the side from a planar platen portion, wherein the same locking means are provided in the area of the front edge along the planar platen portion, said means cooperating with locking means on the cover.

10. A SIM card reader with a contact support and a pivotably mounted cover, wherein the contact support includes a planar platen portion, and wherein a mounting for the cover is provided on the contact support such that the width of the planar platen portion does not exceed the width of the SIM card.

11. A SIM card reader in accordance with claim 1 or claim 10, wherein the cover is mounted on the contact support for a pivoting motion as well as a translational motion.

12. A SIM card reader in accordance with claim 11, wherein the cover is pivotable from a card receiving position to a card contact position whereafter the cover itself or a structural port located on the cover can then be moved into a position in which the SIM card is held in its contact position and the cover is locked.

13. A SIM card reader in accordance with claim 10, wherein the cover, after its pivoting into the contact position of the SIM card, is lockable in this position via additional means provided on the cover.

14. A SIM card reader in accordance with claim 1 or claim 10, wherein the SIM card includes bevelling, and is held in a contact position on the contact support essentially via abutment surfaces provided on the front edge of the SIM card to the bevelling as well as along the rear edge of the SIM card.

15. A SIM card reader in accordance with claim 1 or claim 10, wherein a shoulder, a flange as well as a further flange and a flange running perpendicular to the latter are provided in the area of the front edge of a card sitting in card receiving means that are each equipped with abutment surfaces for the card.

16. A SIM card reader in accordance with claim 1 or claim 10, wherein oval openings are provided in the upper side of the cover that allow one to look onto the contact field of the contact elements when no SIM card is inserted.

* * * * *